US005225644A

United States Patent [19]

Jo

[11] Patent Number: 5,225,644

[45] Date of Patent: Jul. 6, 1993

[54] OVEN DOOR OPENING/CLOSING DEVICE

[75] Inventor: Sung-Yeon Jo, Seoul, Rep. of Korea

[73] Assignee: Samsung Electronics Co., Ltd., Suweon, Rep. of Korea

[21] Appl. No.: 751,115

[22] Filed: Aug. 28, 1991

[30] Foreign Application Priority Data

Aug. 28, 1990 [KR] Rep. of Korea .................... 90-13307

[51] Int. Cl.[5] ........................ B23K 15/10; E05F 5/02; H05B 6/64

[52] U.S. Cl. .................................. 219/10.55 C; 16/82

[58] Field of Search ..................... 16/82; 126/191, 190; 219/10.55 C, 10.55 D

[56] References Cited

U.S. PATENT DOCUMENTS

| | | | |
|---|---|---|---|
| 1,035,298 | 8/1912 | Aspegren | 16/82 |
| 3,188,441 | 6/1965 | Ojelid | 219/10.55 C |
| 4,201,901 | 5/1980 | Schuchert | 219/10.55 C |

*Primary Examiner*—John Sipos

*Assistant Examiner*—Carmine Cuda

*Attorney, Agent, or Firm*—Burns, Doane, Swecker & Mathis

[57] ABSTRACT

An oven door is provided with a mechanism for controlling the rate of door opening and closing. The mechanism includes first and second parts pivotably connected to the oven body and oven door, respectively. A rotary element interconnects the first and second parts in such manner that those parts are relatively longitudinally movable when the door is opened and closed, and such that the rotary member is induced to rotate in response to such relative movement. The rotary member frictionally engages the first and second parts such that relative movement between the parts produces friction forces tending to resist such relative movement and thereby control the rate of opening and closing of the door.

13 Claims, 5 Drawing Sheets

OVEN DOOR OPENING/CLOSING DEVICE

BACKGROUND OF THE INVENTION

This invention relates to an oven door opening/closing device for microwave oven.

As a conventional door opening/closing device for microwave oven, there is, for example, disclosed in Japanese official laid open patent pubication No. Sho 58-48391. The door opening/closing device of microwave oven disclosed in said publication, as shown in present FIG. 1 to FIG. 3, comprises a door 4 which may be freely opened and closed at a front opening of a heating chamber 2 defined within microwave oven 1, sash or frame 6 integrally formed by synthetic resin and the like for carrying the door, and a control panel 7 disposed in the sash 6. The control panel 7 includes a timer 8 for setting a cooking time period, cooking button 9 for starting the cooking, and pilot lamp 10 for indicating a cooking mode. Said door 4, as shown in FIG. 1, is rotatably mounted by a pair of hinge pins 12(refer to FIGS. 2 and 3) and is guided by door arms 13, 13' when being opened and closed. The arms 13, 13' are connected to a pair of guide rollers 14 for guiding the door arms 13, 13'. the door arms 13, 13' are constantly urged to the door-closing direction by a pair of door springs 15. As shown in FIG. 2, door metal plate 16 for sealing the microwave is fixed to an interior metal plate 18 of the door by screws 17 to thereby form a choke 19 for sealing the microwave around an internal periphery of the door 14. The plate 16 makes surface contact with metal plate 20 upon opening of the heating chamber 2 to thereby execute the microwave sealing. Cover body 29 integrally formed of synthetic resin is arranged at an opening 21 of said choke 19 formed at internal periphery of the door 4 and is arranged such that one end thereof slides along a surface 32 of the sash 6 when the door is opened and closed. The surface 32 is curved to thereby reduce the resistance of cover body 29 during a door opening operation. And, front surface plate 23 of the door 4 is fixed to the internal metal plate 18 by screws 24, and said internal metal plate 18 covers a gap 28 present along the lower edge of the oven, because bottom end portion 30 of the cover body 29 is mounted so s to extend across the gap 28 in either of the opened or closed state of the door 4.

By the way, according to the door opening/closing device of thus constructed microwave oven, when the door 4 is opened, since the bottom end portion 30 of the cover body 29 is in contact with metal plate 20 and covers the gap 28 between the bottom portion surface 27 of the door 4, the entry into the gap 28 of dregs of cooked food or other foreign substance is prevented, and the cleaning is also convenient because any spilled material lands on the cover body 29, However, since the guide roller 14 and the door arms 13, 13' are separately formed, there have been various problems that much time and effort are required for precisely assembling these items during mass production and at the same time a space must be provided for door spring 15 and also noise is produced by the expansion or contraction of the door spring 15 in response to the door opening/closing as well as by the travel of the guide roller 14.

Moreover, since opening/closing of the door 4 is controlled by the door spring 15, the action is not so natural, and as shown in FIG. 1, in a state that the door 4 is fully opened, the door arms 13, 13' are exposed. Hence, a container of food or a hand of user may strike those arms when putting in or taking out the cooking food.

Object and Summary of a Preferred Embodiment of the Invention

Therefore, the present invention is made to solve such various above-described problems, and it is an object of the present invention to provide a door opening/closing device for microwave oven in the door opening/closing device is not exposed even when the oven door is fully opened.

In order to acheived aforementioned object, the door opening/closing device of the present invention comprising: base members which are respectively mounted at bottom end portions of both side walls of a microwave oven and that in cross section are bent in substantially U-shape; a helical shaft which is mounted at one side of said base member so as to be movable around a pivot pin thereof; a door lever in which one end is rotatably fixed to the door and another end has a bent portion and a cut out portion for coupling with a hooking protrusion of said base member so as to prevent excessive opening of the door; a sliding member which is to be coupled with a helical groove formed along a lengthwise direction of said helical shaft to control the opening/closing speed of the door according to friction force produced upon rotating; and an accomodating bracket for ratatably accomodating said sliding member.

BRIEF DESCRIPTION OF THE DRAWINGS

The above and further more specific features of the invention will be better understood from a consideration of the following detailed description of a prefered embodiment of the invention, taken with the accompanying drawings, being both description and drawings given as a not rstrictive example only.

DETAILED DESCRIPTION OF THE PREFERRED EMBODIMENT

Figure 1:
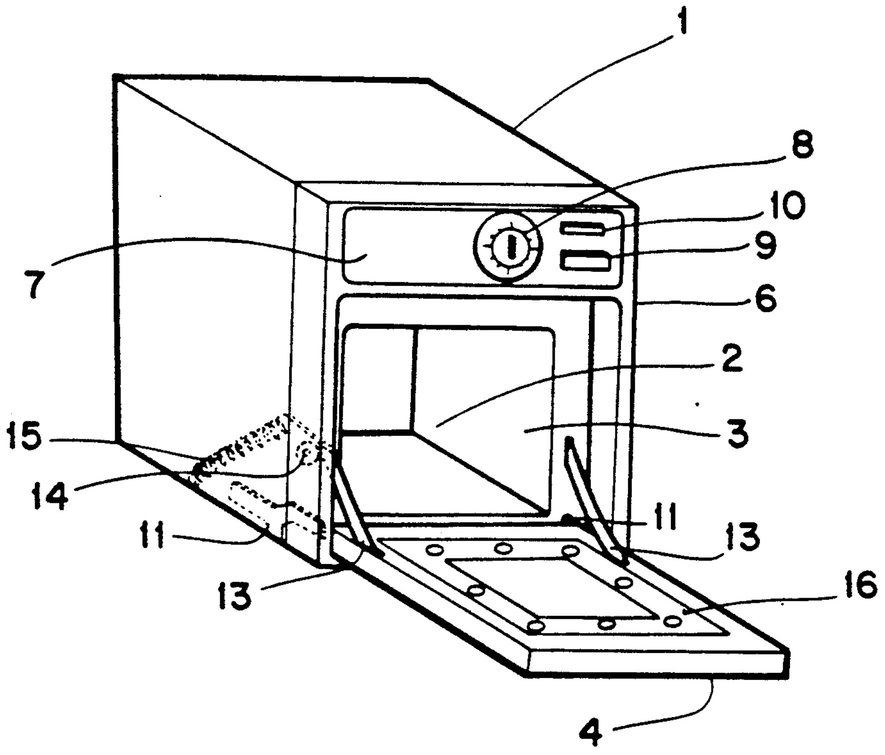
FIG. 1 (PRIOR ART)
FIG. 1 is a perspective view of a conventional microwave oven.
Figure 2:
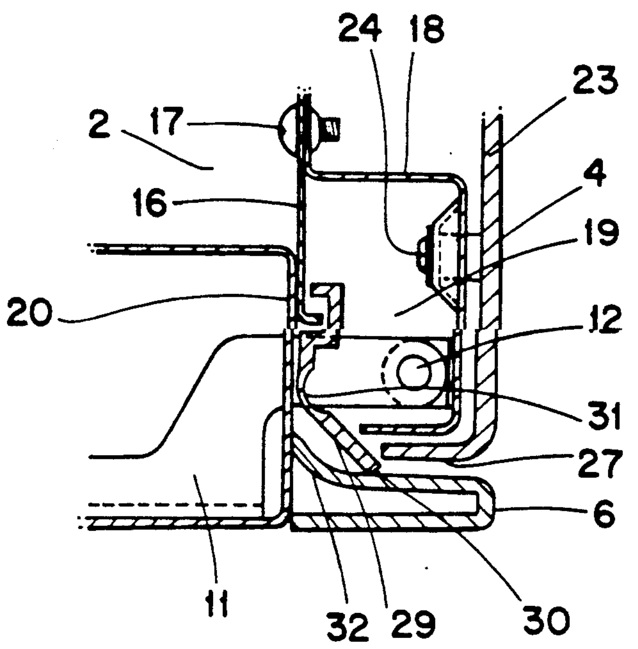
FIG. 2 (PRIOR ART)
FIG. 2 is a fragmentary magnified cross sectional view when the oven door is closed in FIG. 1.
Figure 3:
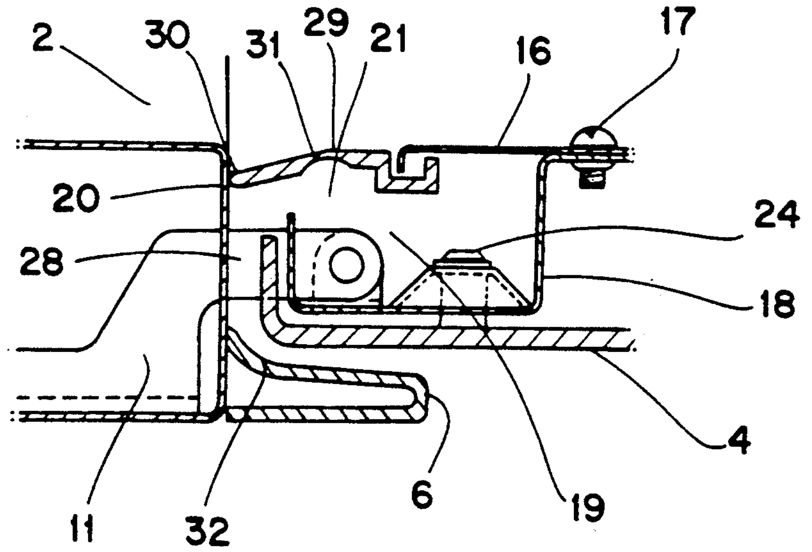
FIG. 3 (PRIOR ART)
FIG. 3 is a fragmentary magnified cross sectional view when the oven door is opened in FIG. 1.
Figure 4:
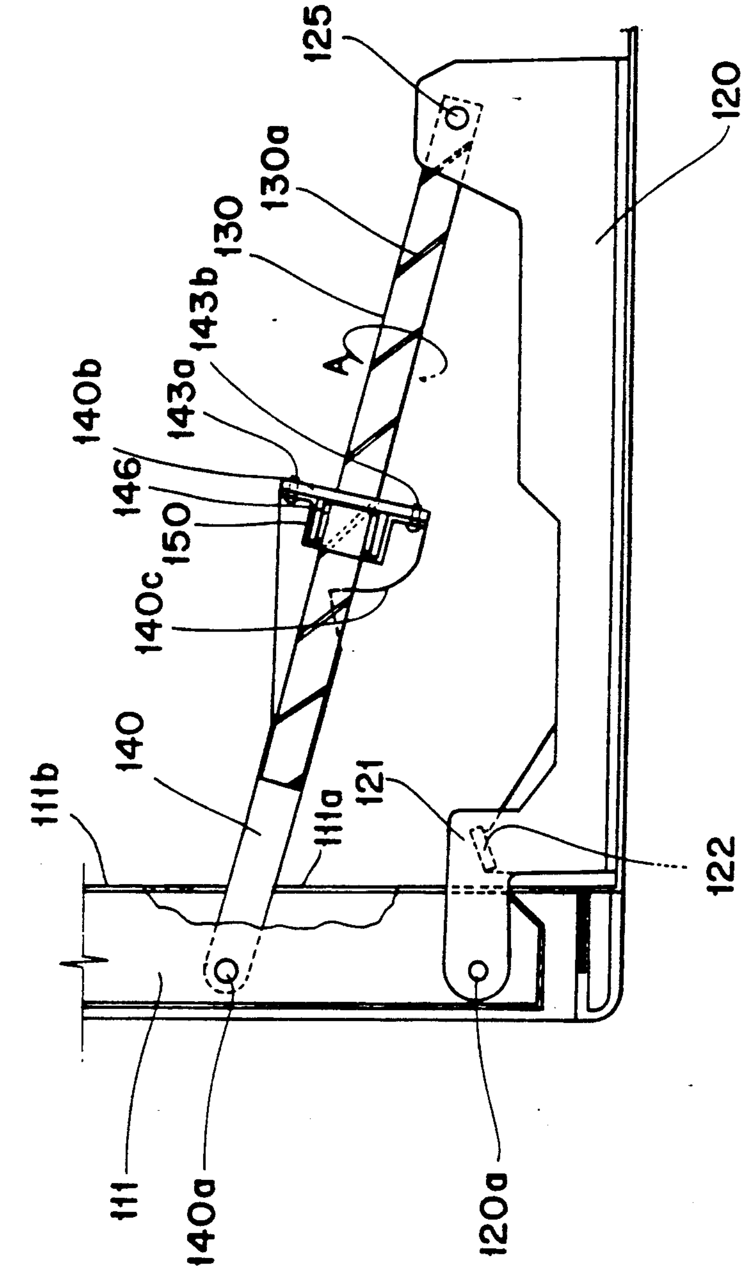
FIG. 4 is a fragmentary cross sectional view when a door is closed according to the present invention.
Figures 5, 6B:
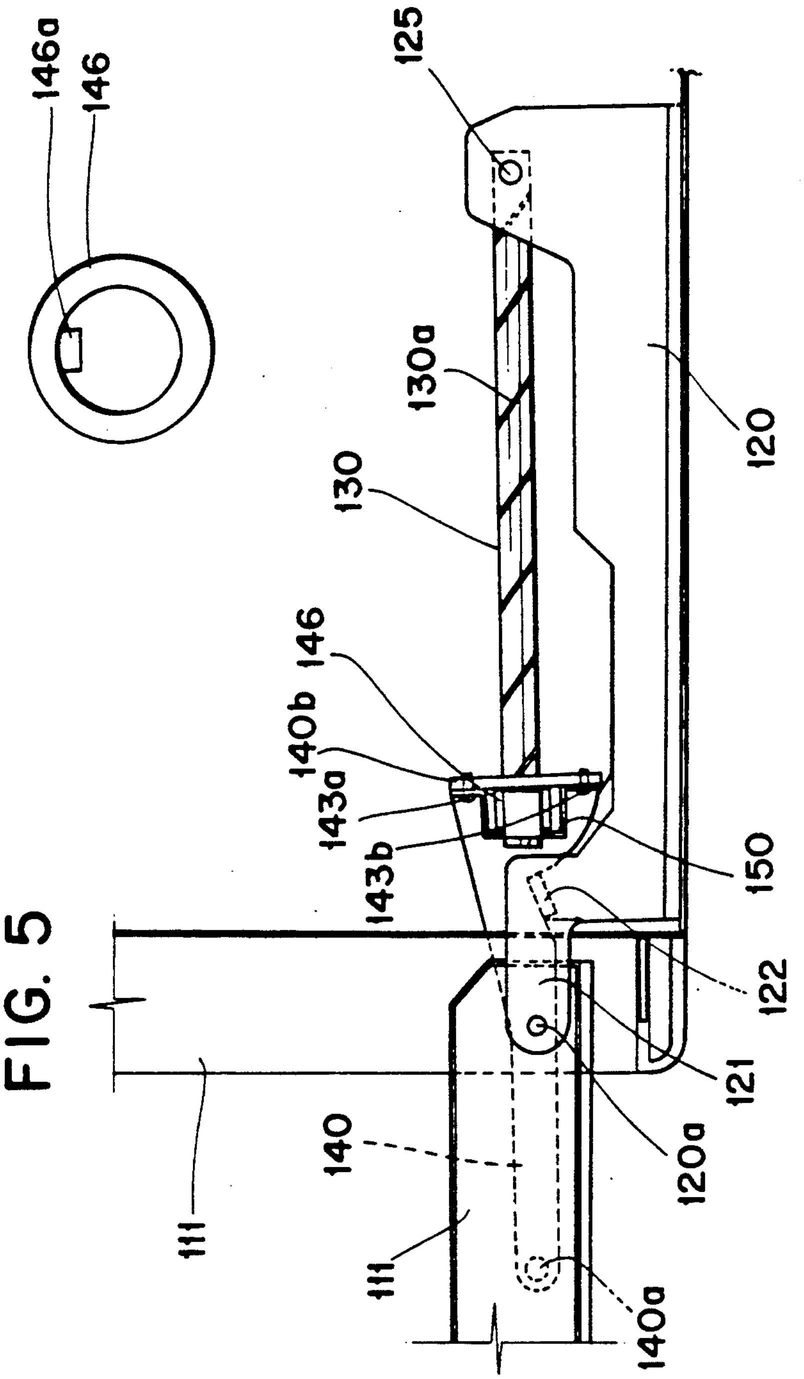
FIG. 5 is a fragmentary cross sectional view when a door is opened in FIG. 4, FIG. 6(*a*) is an exploded perspective view of a door opening/closing device according to the present invention, and FIG. 6(*b*) is a cross sectional view of a sliding member of the device.
Figure 6A:
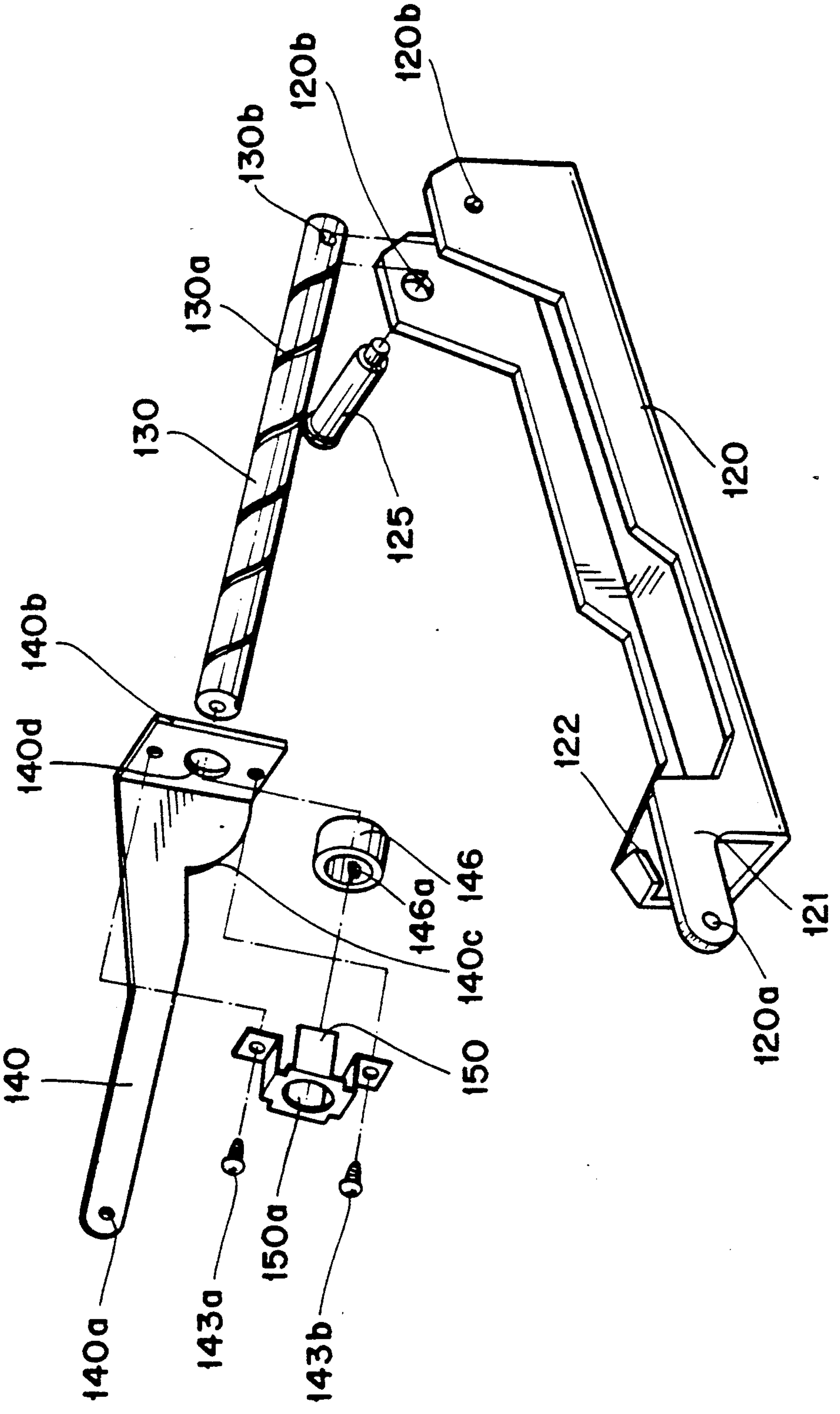

In this invention, the door opening/closing device for microwave oven is comprised of, as shown in FIGS. 4 to 6(*b*), base members 120 which are respectively arranged at both end portions of the bottom of the front wall of a microwave oven and bent in substantially U-shape in cross section as viewed from lengthwise direction (see FIG. 6*a*). A door 111 is pivotably connected to the base members 120 by pivot pins mounted in holes 120*a* of the base members. A shaft 130 made of a round metal bar is formed with a hole 130*b* so as to be pivotably supported by pivot pin 125 which is mounted in two holes 120*b* formed at the base member 120. A door lever 140 having a hole 140*a* is so formed that one end passes through an opening 111*a* which is formed in the door 111. A curved portion 140*c* is formed in the door lever so as to prevent the door 111 being excessively opened by abutting with hooking protrusion 122 of the base member 120 when the door 111 is fully opened a bent portion 140*b* is formed at another end of the door lever and a through hole 140*d* is formed in the bent portion 140*b* so that one end portion of shaft 130 is inserted thereinto. A sliding member 146 made of plastic polycarbonate resin or Rainold resion in a cylindrical shape controls the opening/closing speed of the door 111 according to friction force produced during door opening and closing as will be explained. An external groove 130*a* of helical shape is formed along the length of the shaft 130. An accomodating bracket 150 has a hole 150*a* which slidably receives said sliding member 146 is attached to bent portion 140*b* of door lever 140 by two coupling screws 143 *b* to retain the sliding member 146.

The base member 120 is comprised of a lever portion 121 which is bent in substantially U-shape in case of viewing from left or right side (see FIG. 6*a*). The door connecting hole 120*a* is formed at one end of the lever portion 121 so as to pivotably receive a pivot pin fixed to the door 111. The hooking protrusion 122 abuts with the cut out portion 140*c* formed at a lower portion of door lever 140 so as to prevent the door from being excessively opened.

On the internal circumferential surface of said sliding member 146, as shown in FIG. 6(*b*), there is formed a protuberance 146*a* of semicircular or rectangular shape which may be slidably coupled with groove 130*l*.

Next, the operation and effect of the door opening/-closing device for microwave oven of thus constructed present invention will be described in detail hereinafter.

First, when the door is being opened, since the protuberance 146*a* formed on the internal circumferential surface of the sliding member 146, rotatably accomodated within the accomodating bracket 150, is coupled with the groove 130*a* the sliding member 146 rotates in a direction of arrow A as shown in FIG. 4. Since the cut out portion 140*c* formed to the door lever 140 abuts the hooking protrusion 122 formed on the base member 120 when the door is fully opened as shown in FIG. 5, it prevents the door 111 from being excessively opened. At this moment, the opening/closing speed of the door 111 is controlled according to the friction force of the acomodating bracket 150 resisting rotation of the sliding member 146 together with the frictional force resisting the travel of the protuberance 146*a* long the groove 130*a*. Since the base member 120 and the door 111 are connected by the shaft 130, the sliding member 146, and the door lever 140, the shaft 130 rotates around the pivot pin 125, and a portion of the door lever is drawn out from the shaft 130 to leftward viewed in the drawing to thereby pass through an opening 111*a* formed in a plate 111*b* of the door 111 and is not exposed to the exterior (FIG. 5). Accordingly, there is no worry that any food container or user's hand can strike the door lever 140.

As described above, according to the door opening/-closing device for microwave oven according to the present invention, inasmuch as not only the door connecting holes, the lever portions for operating as a control hinge as convention and two holes for pivot pin are integrally formed in the base member no coil spring is required and it is not necessry to provide interior space for it. Also the groove of helical shape receives the protuberance of the sliding member which slides by the weight of the door itself during the door opening whereby opening of the door is smoothly and slowly executed. Since the door lever of the door opening/-closing device enters the interior of the door of the microwave oven when the door is fully opened, there is no worry that the container of cooked food or hand of user will strike said door lever, and the appearance of the opened door is more pleasing.

At any rate, various changes may be made in said door opening/closing device without departing from the spirit and scope of the invention as defined in the appended claims.

What is claimed is:

1. Apparatus comprising:

a body defining a compartment;

a door pivotably mounted on said body for swinging movement between open and closed positions; and control means for controlling the rate of opening and closing of said door, said control means comprising:

an extensible-retractable unit including first and second parts, said first part having a first end pivotably connected to said body, said second part having a first end portion pivotably connected to said door, and being disposed inside of said door when said door is in a fully open state, the entire remaining portion of said second part and all of said first part being disposed inside of said compartment body when said door is in said fully open state, and a rotary element connecting a second end of said first part to a second end of said second part in a manner permitting relative longitudinal movement between said two second ends and in such manner as to induce rotation of said rotary element in response to said relative longitudinal movement, said rotary element being in frictional contact with at least one of said first and second parts during said rotation so that frictional forces are generated opposing said rotation of said rotary element.

2. Apparatus according to claim 1, wherein said body comprises an oven.

3. Apparatus according to claim 2, wherein said oven comprises a microwave oven.

4. Apparatus according to claim 1, wherein said one of said first and second parts includes a helical groove, said rotary element being mounted on the other of said first and second parts and including a protuberance slidably disposed in said helical groove to produce rotation of said rotary element in response to relative longitudinal movement between said two second ends, said friction forces being produced by contact of said protuberance and a wall of said helical groove.

5. Apparatus according to claim 4, wherein said rotary element rotates about an axis which constitutes the same axis about which said helical groove is formed.

6. Apparatus according to claim 5, wherein said helical groove is formed on an eternal surface of said one of said first and second parts.

7. Apparatus according to claim 6, wherein said rotary element is rotatably mounted on an end of said one of said first and second parts and said protuberance extends radially inwardly from an internal surface of said rotary element.

8. Apparatus according to claim 7, wherein said other of said first and second parts includes means forming a space in which said rotary element is confined to rotate about said axis, said rotary element being in frictional contact with a surface defining said space.

9. Apparatus according to claim 8, wherein said other of said first and second parts includes a first section containing said space-defining means, and a second section which is offset from said first section in a direction laterally of said axis.

10. Apparatus according to claim 9, wherein said first part constitutes said one of said first and second parts, and said second part constitutes said other of said first and second parts, a front end of said second section being pivotably mounted to said door, and a rear end of said second part being pivotably mounted to said body.

11. Apparatus according to claim 10, wherein said second section projects into an opening formed in said door and is arranged to extend horizontally when said door is in a fully open state.

12. An oven comprising:

a body defining a heating compartment, a door pivotably mounted to said body for swinging movement between open and closed positions, and control means for controlling the rate of opening and closing of said door, said control means comprising:

a cylindrical first part having a front end, a rear end pivotably connected to said compartment, and a helical groove formed on an outer periphery of said first part, a second part having a rear end, and a front end pivotably mounted to said door, and a rotary element mounted adjacent said rear end of said second part for rotation about a longitudinal axis, said front end of said first part extending through an opening in said rotary element such that said longitudinal axis coincides with an axis about which said helical groove is formed, said rotary element being slidable longitudinally along said first part when said door is opened and closed such that said rotary element approaches said rear end of said first part when said door is being opened, said rotary element including a protuberance extending radially inwardly from a surface of said opening and received in said helical grove such that said rotary element is induced to rotate when said door is opened and closed, and said protuberance engaging a wall of said helical groove to generate frictional forces resisting the opening and closing of said door, said second part extending forwardly into a slit formed in said door such that a front section of said second part is disposed inside said door when said door is in a fully opened state, said second part extending generally horizontally rearwardly from said slit such that the entire remaining section of said second part and all of said first part are disposed inside of said oven body when said door is in said fully open state.

13. Apparatus comprising a body defining a compartment, a door pivotably mounted on said body for swinging movement between open and closed positions, and control means for controlling the rate of opening and closing of said door, said control means comprising an extensible-retractable unit including first and second parts, said first part having a first end pivotably connected to said body, said second part having a first end pivotably connected to said door, and a rotary element connecting a second end of said first part to a second end of said second part in a manner permitting relative longitudinal movement between said two second ends and in such manner as to induce rotation of said rotary element in response to said relative longitudinal movement, said rotary element being in frictional contact with at least one of said first and second parts during said rotation so that frictional forces are generated opposing said rotation of said rotary element, a base member fixedly connected to said body, said door being pivotably connected to one section of said base member, and said first part being pivotably connected to another section of said base member, said base member carrying a stop which engages one of said first and second parts to terminate pivoting movement of said first and second parts when said door is in said fully open state.

* * * * *